(12) United States Patent
Oxner et al.

(10) Patent No.: US 11,407,352 B2
(45) Date of Patent: Aug. 9, 2022

(54) MULTI-PURPOSE VEHICLE

(71) Applicant: KUBOTA CORPORATION, Osaka (JP)

(72) Inventors: Jay Oxner, Sautee Nacoochee, GA (US); Takashi Fujii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 158 days.

(21) Appl. No.: 16/409,274

(22) Filed: May 10, 2019

(65) Prior Publication Data
US 2020/0353859 A1  Nov. 12, 2020

(51) Int. Cl.
| | | |
|---|---|---|
| *B60Q 11/00* | (2006.01) |
| *B60Q 1/00* | (2006.01) |
| *B62D 33/02* | (2006.01) |
| *B60R 16/033* | (2006.01) |
| *F21V 23/04* | (2006.01) |
| *F21V 23/00* | (2015.01) |
| *F21Y 115/10* | (2016.01) |

(52) U.S. Cl.
CPC ......... *B60Q 1/0035* (2013.01); *B60Q 1/0076* (2013.01); *B60Q 1/0088* (2013.01); *B60R 16/033* (2013.01); *B62D 33/02* (2013.01); *F21V 23/001* (2013.01); *F21V 23/04* (2013.01); *F21Y 2115/10* (2016.08)

(58) Field of Classification Search
CPC .. B60Q 1/0035; B60Q 1/0076; B60Q 1/0088; B60Q 3/30; B62D 33/02; B60R 16/033; F21V 23/04; F21V 23/001; F21Y 2115/10
See application file for complete search history.

(56) References Cited

U.S. PATENT DOCUMENTS

| | | | | |
|---|---|---|---|---|
| 6,238,068 | B1 * | 5/2001 | Farmer, Jr. ............... | B60Q 3/30 362/230 |
| 10,807,518 | B2 * | 10/2020 | Miranda Nieto ...... | B60Q 1/307 |
| 2004/0130902 | A1 * | 7/2004 | Snyder ..................... | B60Q 3/30 362/485 |
| 2007/0008732 | A1 * | 1/2007 | Robertson ................ | B60Q 1/32 362/459 |
| 2011/0140605 | A1 * | 6/2011 | Mann ....................... | B60Q 1/24 315/77 |
| 2014/0198510 | A1 * | 7/2014 | Law ......................... | B60Q 3/35 362/485 |
| 2017/0320423 | A1 * | 11/2017 | Tashiro .................... | G05G 5/04 |
| 2018/0334199 | A1 | 11/2018 | Ueno et al. | |
| 2019/0283811 | A1 * | 9/2019 | Fisher .................. | B62D 33/027 |

FOREIGN PATENT DOCUMENTS

JP    2016-94133    5/2016

* cited by examiner

*Primary Examiner* — Rajarshi Chakraborty
*Assistant Examiner* — Glenn D Zimmerman
(74) *Attorney, Agent, or Firm* — Greenblum & Bernstein, P.L.C.

(57) ABSTRACT

A multi-purpose vehicle includes a load carrier deck supported to a vehicle body frame which is supported on a ground surface via front wheels and rear wheels. The load carrier deck includes a deck constituting unit having a bottom plate, a left wall, a right wall, a front wall and a rear wall. A lamp for illuminating inside of the load carrier deck is provided in the deck constituting unit.

7 Claims, 6 Drawing Sheets

– 1 –
MULTI-PURPOSE VEHICLE

TECHNICAL FIELD

This invention relates to a multi-purpose vehicle having a seat supported to a vehicle body frame that is supported on a ground surface via front wheels and rear wheels and a load carrier deck supported to the vehicle body frame rearwardly of the seat.

BACKGROUND ART

The load carrier deck of such multi-purpose vehicle is comprised of a bottom plate and left and right sides walls and front and rear walls that are disposed to surround the bottom plate. With this, various articles can be mounted stably in the inside of the load carrier deck even in the course of traveling on a bad road.

A conventional multi-purpose vehicle, as disclosed in U.S. Patent Application Publication No. 2018/0334199, includes tail lamps beneath left and right rear end portions of the load carrier deck. Such tail lamps includes a braking lamp, a back lamp, a direction indicator lamp. All such lamps are arranged to allow light beams emitted from these lamps to be confirmed from the outside of the vehicle. Therefore, of the light beams emitted from these lamps, an amount of light irradiating the inside of the load carrier deck is limited. For this reason, when the surrounding environment becomes dark, the inside of the deck will remain dark even with illumination by the lamps.

Further, in the case of a multi-purpose vehicle disclosed in Japanese Unexamined Patent Application Publication No. 2016-94133, between a driver's seat and a load carrier deck, there is provided a rear post which is attached to a vehicle body frame. And, a rear work lamp is attached to a bracket which is fixed to an upper portion of this rear post. This work lamp emits light beam toward the rear side, so it illuminates the upper side of the load carrier deck. However, as the rear work lamp is mounted to a highest position of the vehicle with the axis of its light being substantially horizontally oriented, it can not illuminate sufficiently the peripheral area of the front wall or the area adjacent the bottom plate of the deck in particular. In order to illuminate the inside of the load carrier deck sufficiently with this work lamp, this will require a lamp whose light amount is too large to be readily provided by power supplying capacity of the multi-purpose vehicle, thus presenting a problem in the respect of electric power saving.

SUMMARY OF THE INVENTION

An object of the present invention is to provide a multi-purpose vehicle having a lamp disposed for efficient illumination of inside of a load carrier deck.

A multi-purpose vehicle according to the present invention comprises front and rear wheels, a seat supported to a vehicle body frame which is supported on a ground surface via the front and rear wheels, a load carrier deck supported to the vehicle body frame rearwardly of the seat, and a lamp for illuminating inside of the load carrier deck. The load carrier deck includes a deck constituting unit having a bottom plate, a left wall, a right wall, a front wall and a rear wall; and the lamp is provided in the deck constituting unit.

With the above-described arrangement, the inside of the load carrier deck surrounded by the deck constituting unit is illuminated from the inside of the deck by the lamp provided in the deck constituting unit. Therefore, in comparison with illumination by the lamp from the outside of the load carrier deck, there is less possibility of darkness remaining inside the load carrier deck. Through illumination from the inside walls of the deck, even a small article placed adjacent a corner of the deck constituting unit of the deck, in particular, adjacent the bottom plate, can be readily visible.

The position of a lamp for favorably illuminating the inside of the load carrier deck can often be different from the position of a switch suitable for a user's ON/OFF operation of the lamp. In particular, it is desired that such switch can be operated from the outside of the load carrier deck also. For this reason, according to one preferred embodiment of the present invention, the switch is disposed at a position operable from the outside of the load carrier deck. Namely, the lamp and the switch can be provided at positions distant from each other also.

Further, in order to avoid interference between the lamp and its switch included in the deck constituting unit and an article mounted on the load carrier deck, according to one preferred embodiment of the present invention, the lamp and the switch are embedded in the deck constituting unit.

It will be convenient if power supply to the lamp is effected via a wiring network (electric harness) of the vehicle. As such wiring network is present in concentration in the periphery of the driving section, the lamp can advantageously be provided in the front wall adjacent the seat. This is advantageous since the arrangement allows reduction in the length of the power supply wiring.

In case a distance from the wiring network and the lamp is long, a battery-driven LED lamp can be employed advantageously. For, this arrangement conveniently makes power supply line to the lamp unnecessary.

DETAILED DESCRIPTION

Next, an embodiment of a multi-purpose vehicle as one embodiment of a work vehicle relating to the present invention will be explained. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
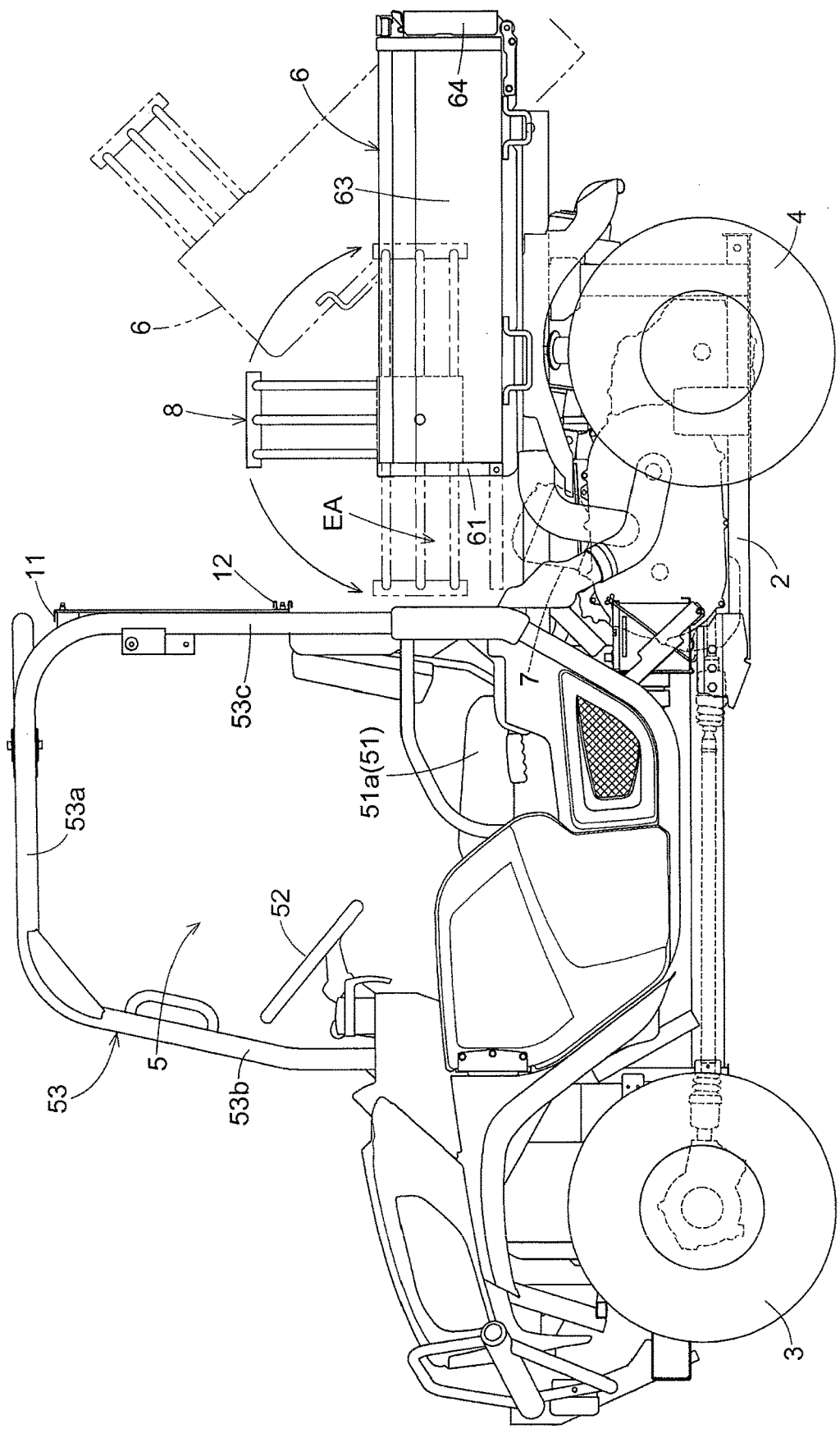
FIG. 1 is a side view of a multi-purpose vehicle.
Figure 2:
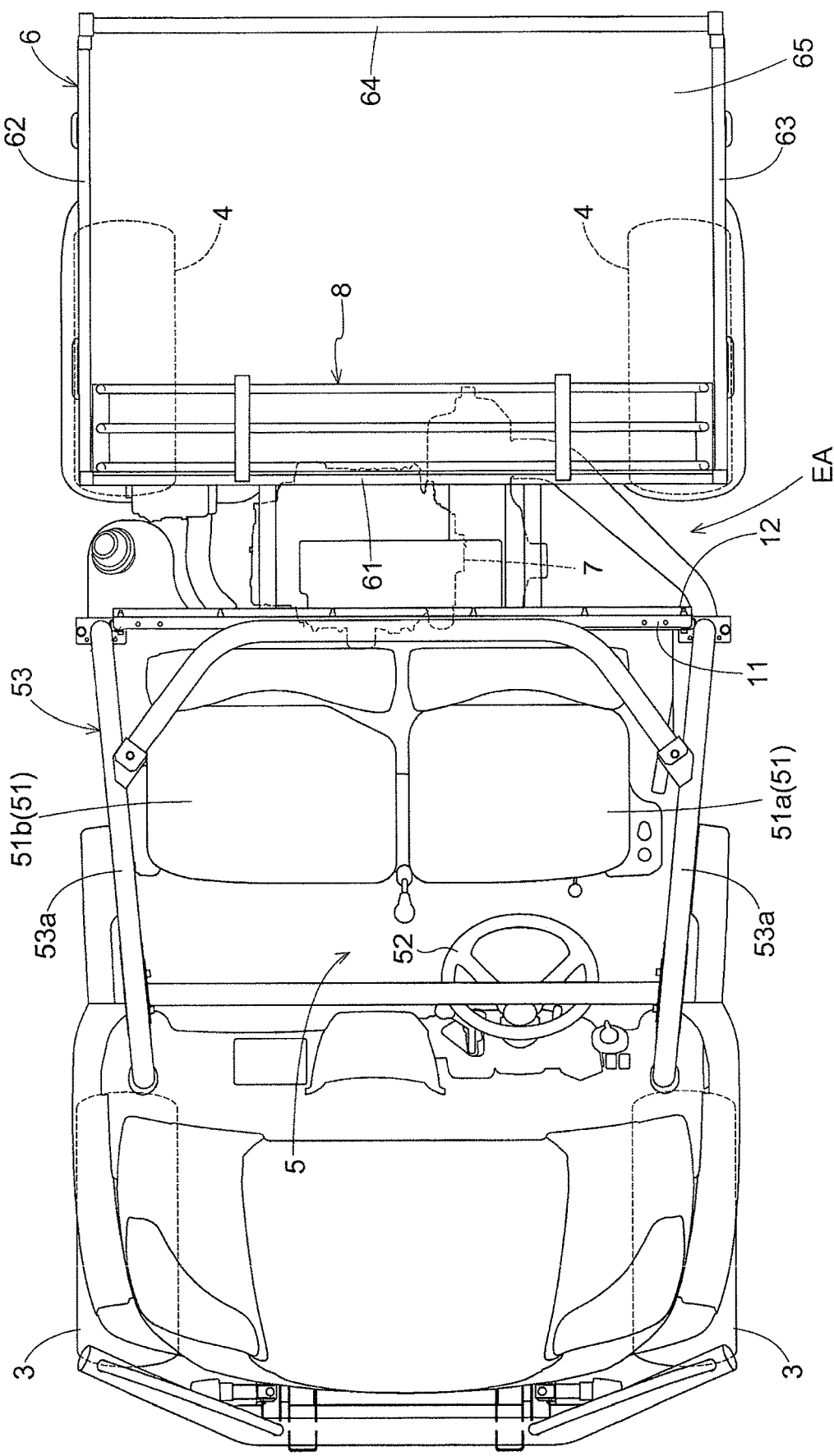
FIG. 2 is a plan view of the multi-purpose vehicle.

As shown in FIG. 1, the multi-purpose vehicle includes a vehicle body frame 2. Under the vehicle body frame 2, there are provided a pair of left and right front wheels 3 and a pair of left and right rear wheels 4. The multi-purpose vehicle can be self-propelled via the pair of left and right front wheels 3 and the pair of left and right rear wheels 4. As shown in FIG. 1 and FIG. 2, at a front/rear center portion of the multi-purpose vehicle, a driving section 5 is provided. This driving section 5 includes seats 51 consisting of a driver's seat 51a and a passenger's seat 51b, a steering wheel 52 and a ROPS 53. Further rearwardly of the driving section 5, a load carrier deck 6 is provided. This load carrier deck 6 can mount various articles thereon. And, beneath the load carrier deck 6, an engine 10 is disposed.

As shown in FIG. 1 and FIG. 2, the ROPS 53 includes an upper frame body 53a, a pair of left and right front posts 53b and a pair of left and right rear posts 53c. The upper frame body 53a is disposed upwardly of the seats 15. Also, the pair of left and right front posts 53b and the pair of left and right rear posts 53c respectively extend vertically. And, the upper frame body 53a is supported by the pair of left and right front posts 53b and the pair of left and right rear posts 53c.

Between the left rear post 53c and the right rear post 53c, there are provided an upper frame member 11 and a lower frame member 12. These upper frame member 11 and lower frame member 12 respectively extend horizontally in the vehicle body transverse direction.

As shown in FIG. 1, the load carrier deck 6 is configured to be pivotable up/down between an elevated posture denoted with two-dot chain lines and a lowered posture denoted with solid lines. Under the elevated posture, the front end portion of the load carrier deck 6 is elevated and the load carrier deck 6 is inclined forwardly downwards. And, under the lowered posture, the load carrier deck 6 is horizontal.

Figure 3:
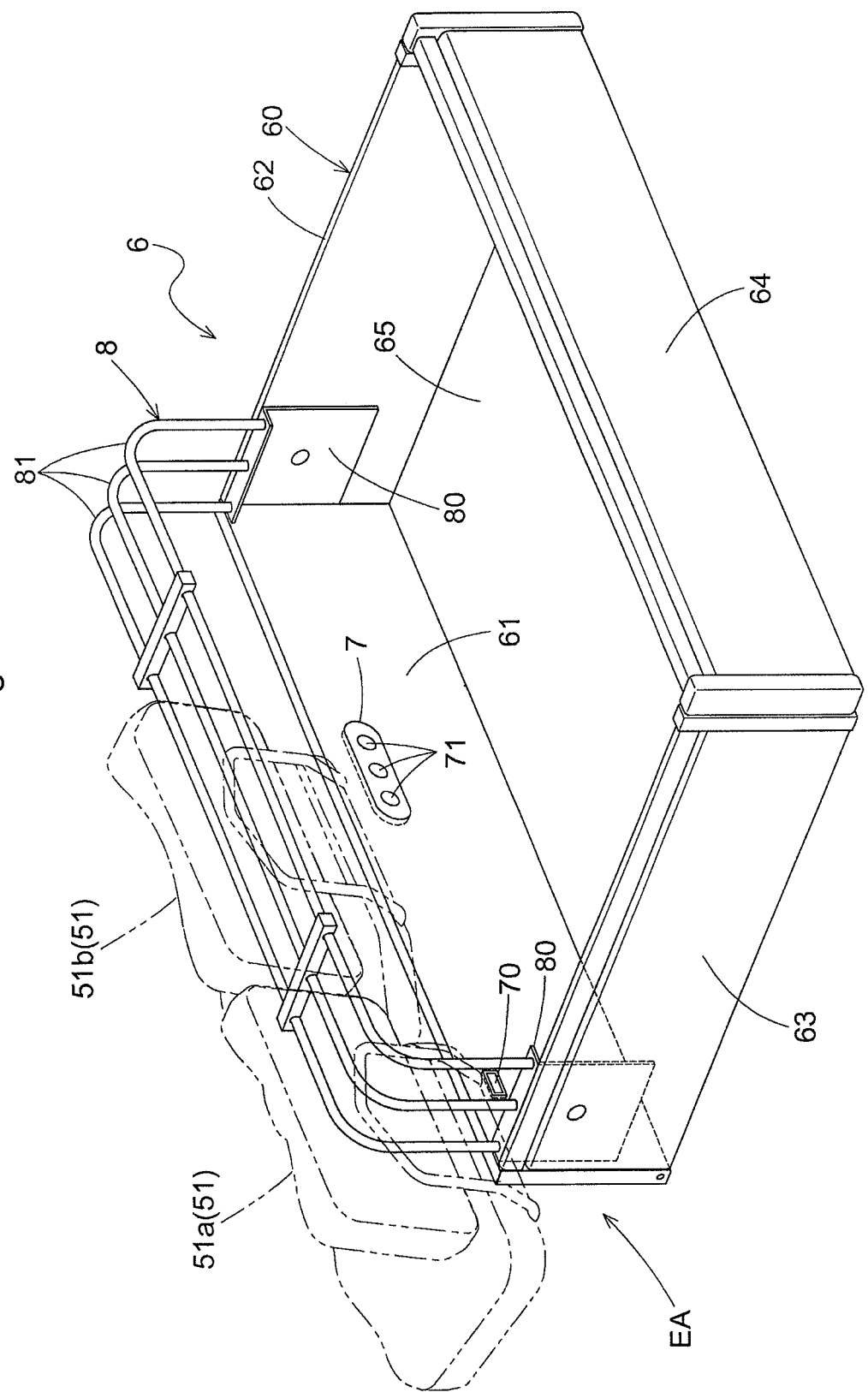
FIG. 3 is a perspective view of a load carrier deck provided with a lamp and a switch.

As shown in FIG. 1 and also in FIGS. 2 and 3, the load carrier deck 6 comprises a deck constituting unit 60 consisting essentially of a bottom plate 65, a front wall 61, a right wall 62, a left wall 63 and a rear wall 64. The front wall 61, the right wall 62, the left wall 63 and the rear wall 64 rise from the outer circumferential edge of the bottom plate 65. The deck constituting unit 60 creates a rectangular-shaped space in its inside.

A lamp 7 is provided slightly upwardly of a center portion of the front wall 61 in the vehicle body transverse direction. In the instant embodiment, this lamp 7 is constituted of a plurality (seven in this embodiment) of LED lamps 71 disposed side by side. These LED lamps 71 receive electric power via a power supply line connected to an unillustrated power supply wiring (electric harness) of this multi-purpose vehicle. To this power supply line, there is connected a switch 70 for switching ON/OFF the lamp 7. The switch 70 is disposed adjacent a corner of the load carrier deck 7 distant from the lamp 7 so that a user can operate it even from the outside of the load carrier deck 6.

In the case of the example shown in FIG. 3, the plurality of LED lamps 71 are disposed side by side horizontally. Instead, these may be disposed side by side vertically or disposed in a grating pattern. Further, as the lamp 7, a single LED lamp unit can be employed also, or any other type of illuminating device may be employed.

Also, in order to avoid interference with an article mounted on the load carrier deck, the lamp 7 and/or the switch 70 can be embedded in the deck constituting unit 60 so as to be flush with the surface of this deck constituting unit 60 (the front wall 61 in the case of FIG. 3 illustration).

In the case of the example shown in FIG. 3, the lamp 7 is provided in the front wall 61. Instead, it may be provided in any one of the right wall 62, the left wall 63, the rear wall 64 and the bottom plate 65. Further alternatively, it may be provided in a plurality of the right wall 62, the left wall 63, the rear wall 64 and the bottom plate 65. And, the switch 70 too may be provided at a plurality of positions.

In the instant embodiment, the load carrier deck 6 can have its inner space (load carrying area) extended forwardly in the vehicle body front/rear direction. Further, a slide mechanism is incorporated in the seats 51. FIG. 3 shows the load carrier deck 6 with its deck space being under its normal state (non-extended state). Under this normal state, a rectangular-shaped extendible space EA is present between the seats 15 and the front wall 61 of the deck constituting unit 60. As each seat 15 is slidable rearwards, a comfortable seat position according to the physique of the seated person can be selected.

Figure 4:
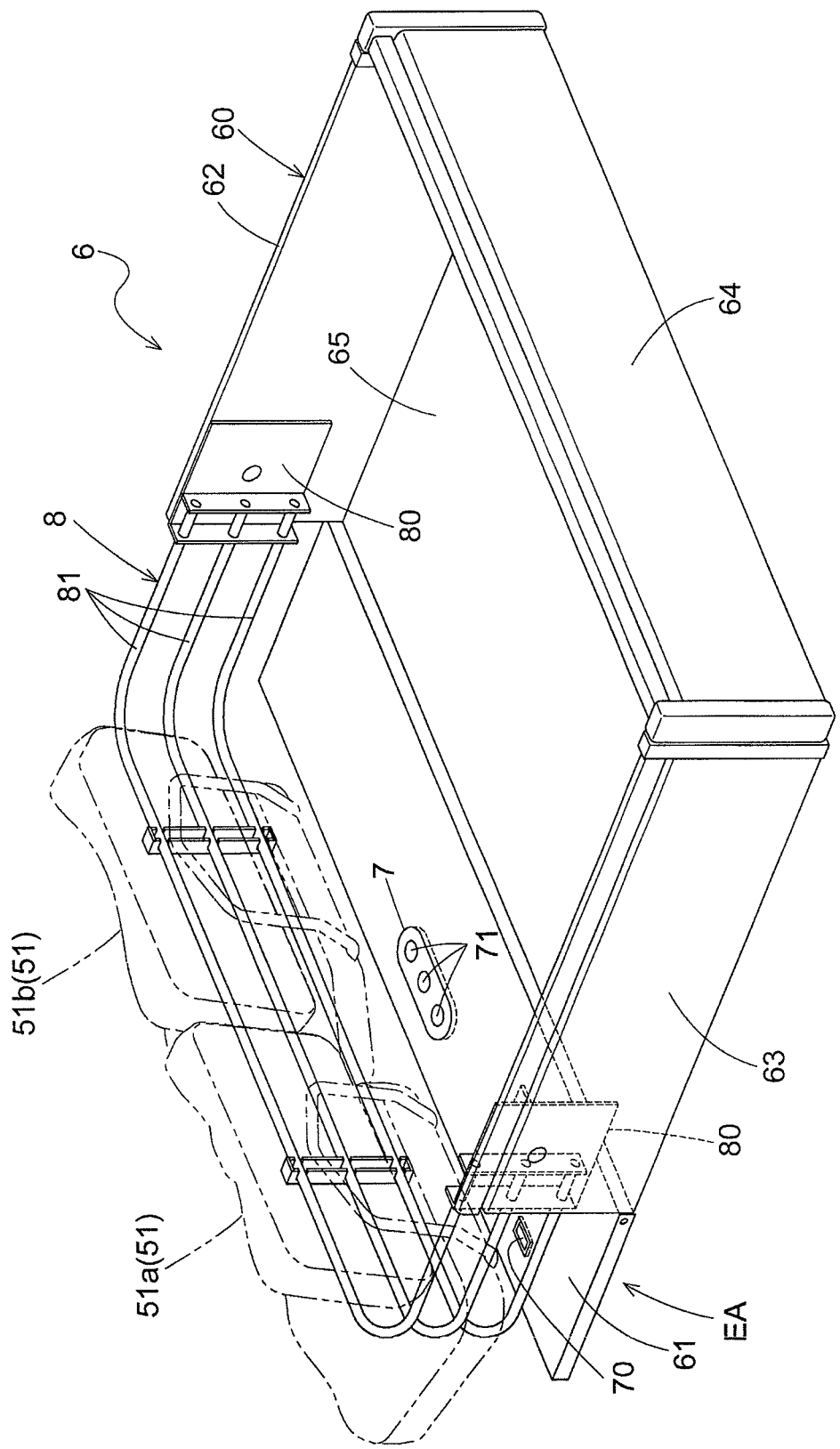
FIG. 4 is a perspective view of the multi-purpose vehicle with its load carrier deck being extended forwardly.

As shown in FIG. 3 and FIG. 4, between and across the front end region of the right wall 62 and the front end region of the left wall 63 of this load carrier deck 6, there is provided an arch gate 8 which can swivel by 180 degrees about a horizontal axis. The arch gate 8 consists of a pair of left and right pivot bases 80 and three arch-shaped pipes 81 detachably attached to the left and right pivot bases 80. The arch gate 8 can be retained at three pivotal positions, namely, an extended position (swivel angle of 180 degrees), an erect position (swivel angle of 90 degrees) and a folded position (swivel angle of 0 degree).

As shown in FIG. 4, when the arch gate 8 is pivoted to the extended position, the arch-shaped pipes 81 will enter the extendible space EA, so that the inside space of the load carrier deck 6 is extended by an amount corresponding to the extendible space EA. The floor of the load carrier deck 6 in the extended inside space is created by the front wall 61 which has been pivoted forwardly by 90 degrees. The floor level of the arch gate 8 at its extended position is substantially same as that of the right wall 62, the left wall 63 and the rear wall 64. The arch gate 8 at the extended position functions as an extension wall that surrounds the extended area of the load carrier deck 6. When the inside space of the load carrier deck 6 is extended, sliding of the seat 15 to the rear side is no longer possible. With this multi-purpose vehicle, there are provided two patterns of deck size and two patterns of staying (residential) space for the passengers seated at the seats 51.

Figure 5:
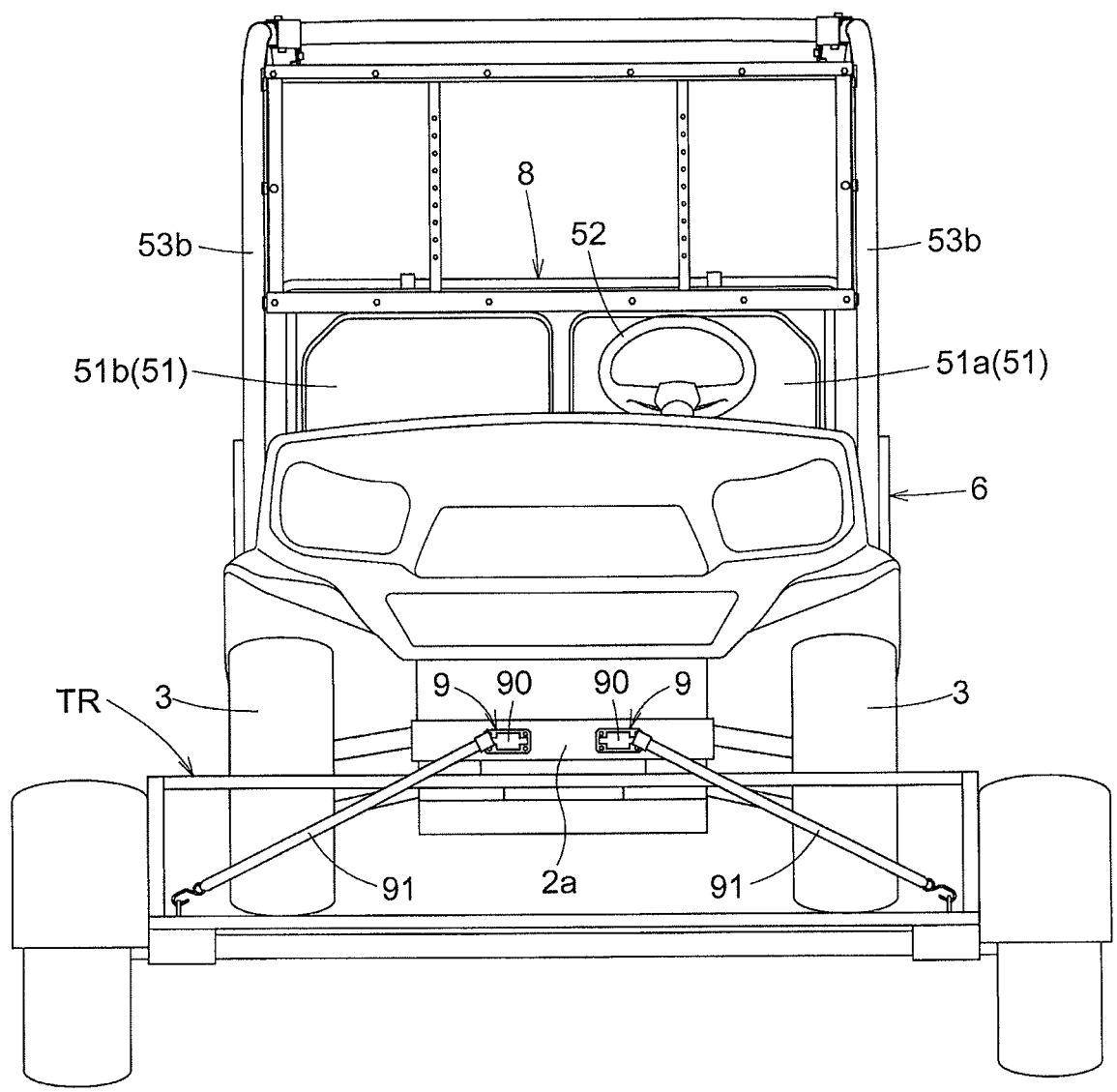
FIG. 5 is a front view of the multi-purpose vehicle having tie-downs.
Figure 6:
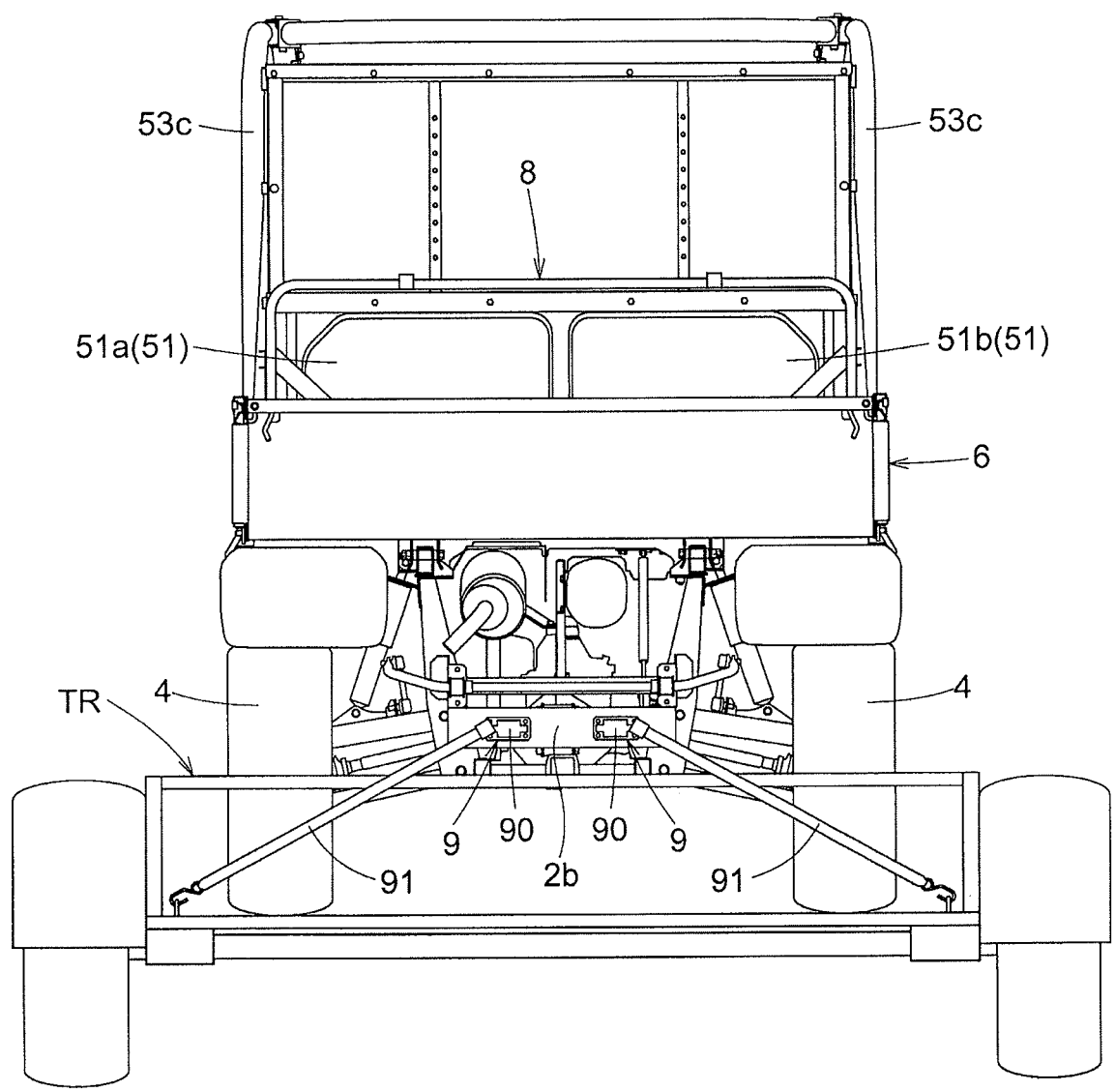
FIG. 6 is a rear view of the multi-purpose vehicle having the tie-downs.

As shown in FIG. 5, to the front end portions 2a of the vehicle body frame 2, two tie-down straps 9 disposed side by side are fixed. Further, as shown in FIG. 6, at the rear end portions 2b of the vehicle body frame 2, two tie-down straps 9 disposed side by side are fixed. With this, when the multi-purpose vehicle is transported as being mounted on a trailer deck vehicle TR, straps 91 will be withdrawn from bodies 90 of the tie-down straps 9 and hooks provided at leading ends of the straps 91 will be engaged (hooked) on hooks provided in the trailer deck vehicle TR, whereby the multi-purpose vehicle will be firmly and reliably fixed to the trailer deck vehicle TR via the tie-down straps 9 provided at the front left and right portions and the tie-down straps 9 provided at the rear left and right portions. As the straps 91 of the tie-down straps 9 are wound around the bodies 90, they will not present any obstacle when not used. As the bodies 90 of the tie-down straps 9 are fixed to the front end portion 2a and the rear end portion 2b of the vehicle body frame 2, no space is needed for storage of these tie-down straps 9, and there is no risk of loss thereof either.

In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A multi-purpose vehicle comprising:
   front and rear wheels;
   a seat supported to a vehicle body frame which is supported on a ground surface via the front and rear wheels;
   a load carrier deck supported to the vehicle body frame rearwardly of the seat, the load carrier deck having a bottom plate, a left wall, a right wall, a front wall and a rear wall; and
   a lamp for illuminating an inside of the load carrier deck, the lamp being embedded in and flush with a surface of at least one of the left wall, the right wall, the front wall, and the rear wall, wherein
   a switch for switching ON/OFF the lamp is provided in the deck, and
   the lamp and the switch are separate from each other and located at different positions of the load carrier deck, and
   wherein the lamp and the switch are provided in the front wall, and the front wall is configured to rotate 90 degrees to a position parallel to the bottom plate to extend the load carrier deck.

2. The multi-purpose vehicle of claim 1, wherein the switch is provided at a position operable from the outside of the load carrier deck.

3. The multi-purpose vehicle of claim 1, wherein the lamp and the switch are embedded in the deck so as not to protrude from an inside face of the deck.

4. The multi-purpose vehicle of claim 1, wherein the lamp receives electric power from a power supply wiring distributed in the vehicle body.

5. The multi-purpose vehicle of claim 1, wherein the lamp comprises a battery-driven LED lamp.

6. The multi-purpose vehicle of claim 1, wherein the lamp is provided upwardly of a center portion of the front wall in a vehicle body transverse direction and the switch is disposed adjacent a corner of the load carrier deck.

7. The multi-purpose vehicle of claim 1, wherein the surface of at least one of the left wall, the right wall, the front wall, and the rear wall is an inner surface of the deck.

* * * * *